United States Patent [19]

Borner et al.

[11] 4,271,127
[45] Jun. 2, 1981

[54] APPARATUS FOR THE CONTINUOUS PRECIPITATION OF URANIUM PEROXIDE

[76] Inventors: Paul Borner, 18 Goethestrasse, 6463 Freigericht 1; Hans-Jorg Isensee, 20 Raiffeisenstrasse, 6454 Bruchkobel 4; Horst Vietzke, 19 Burgstrasse, 6457 Maintal 4, all of Fed. Rep. of Germany

[21] Appl. No.: 955,606

[22] Filed: Oct. 30, 1978

Related U.S. Application Data

[62] Division of Ser. No. 801,245, May 27, 1977, Pat. No. 4,152,395.

[30] Foreign Application Priority Data

May 28, 1976 [DE] Fed. Rep. of Germany ....... 2623977

[51] Int. Cl.³ .............. C09K 3/00; G21C 19/42; G21C 21/02; G21F 9/06
[52] U.S. Cl. .............. 422/159; 422/225; 252/301.1 S
[58] Field of Search .............. 23/305 RE; 423/16, 260, 423/261; 422/159, 225; 252/301.1 S

[56] References Cited

U.S. PATENT DOCUMENTS

| | | | |
|---|---|---|---|
| 2,551,543 | 5/1951 | Mohr | 423/16 |
| 2,701,193 | 2/1955 | Heudier et al. | 422/225 |
| 2,723,181 | 11/1955 | Larson | 423/260 |
| 2,852,336 | 9/1958 | Seaburg et al. | 423/260 |
| 3,037,840 | 6/1962 | Gregory et al. | 423/260 |
| 3,676,075 | 7/1972 | Ploger et al. | 422/224 |
| 3,839,435 | 10/1974 | Shigeyasu et al. | 422/225 |

OTHER PUBLICATIONS

"Comprehensive Inorganic Chem."; Pergamin Press, N. Y.; 1973; pp. 249 & 250.

*Primary Examiner*—Bradley R. Garris
*Attorney, Agent, or Firm*—Cushman, Darby & Cushman

[57] ABSTRACT

A process and apparatus for the production of pourable, directly compactable uranium dioxide powder by continuous precipitation of uranium peroxide from a stirred uranyl nitrate solution at a pH of 1–2.5 with hydrogen peroxide, calcining of the peroxide at 500°–800° C. and subsequent reduction at 550°–750° C. The precipitation solution contains 70–150 g/l of uranium and 0.80 g/l of ammonium nitrate and is treated with 15–20% aqueous hydrogen peroxide solution in the ratio of $U:H_2O_2$ from 1:1.5 to 1:3 and there is led through the solution a mixture of ammonia and air having an air-ammonia volume ratio of 1:0.3–0.6.

2 Claims, 3 Drawing Figures

APPARATUS FOR THE CONTINUOUS PRECIPITATION OF URANIUM PEROXIDE

This is a division of application Ser. No. 801,245, filed May 27, 1977, now U.S. Pat. No. 4,152,395.

BACKGROUND OF THE INVENTION

The present invention is directed to a process and apparatus for the production of directly pressable (moldable) uranium dioxide powder from uranium peroxide ($UO_4.xH_2O$) which is continuously precipitated from uranyl nitrate solution whereby by variation of the precipitation conditions as well as the temperature in the subsequent calcination and reduction the properties of the $UO_2$ powder are so regulated that in the pressing and sintering of tablets (pellets) it is possible to vary the sintered density in the large range of 75-95% of the theoretical density without additional conditioning steps such as plasticizing, granulating or sieving.

In order to take steps against the swelling of the fuel at the higher burn-up rates in modern light water reactors, the sintered density in the $UO_2$ pellets has been reduced from 95% of the theoretical density partially up to 90%. Such a variation of the sintered density is not possible with the previously known processes for the production of uranium dioxide and of the thus obtained powders. The future reactor generation, the sodium cooled breeder reactor, however, must contain pellets with a sintered density of only 80-85% of the theoretical density. For this purpose, the presently known processes for the production of uranium dioxide powder must employ a conditioning of the $UO_2$ powders. Either the entire $UO_2$ powder must be subsequently calcined at 1100°-1400° C. or be mixed with a large portion of highly calcined $UO_2$. Such powders, however, are inclined partially to resintering which cannot be permitted for the operation of the reactor since the fuel elements are damaged thereby.

There have become known a series of precipitation processes according to which sinterable $UO_2$ is produced from uranyl nitrate solutions. However, there are only a few processes, as, e.g., via the precipitation of ammonium uranyl carbonate, with which it is possible to produce a free-flowing $UO_2$ powder which permits a direct pressing of $UO_2$ pellets without pretreatment. With all known processes, however, there is formed a $UO_2$ powder from which there can only be produced pellets with relatively high sintered density.

Therefore, it was the problem of the present invention to find a process and apparatus for the production of a free-flowing uranium dioxide powder which could be directly compacted and worked to pellets with an adjustable sintered density of 75-95% of the theoretical density without granulating or other aftertreatment.

SUMMARY OF THE INVENTION

This problem was solved by producing the uranium dioxide powder by continuous precipitation of uranium peroxide from uranyl nitrate solution with hydrogen peroxide, calcining the peroxide at 500°-800° C. and subsequently reducing it at 550°-750° C. According to the invention, the precipitation solution contains 70-150 g/l of uranium and 0-80 g/l of ammonium nitrate. To this solution there is added a 15 to 20% aqueous hydrogen peroxide solution in the ratio of U:$H_2O_2$ of from 1:1.5 to 1:3 and there is led through the solution an ammonia-air mixture with an air to ammonia volume ratio of 1:0.3 to 1:0.6. The pH of the solution must be adjusted to 1-2.5 and additionally the reaction mixture is stirred. When ammonium nitrate is employed, it usually is present in an amount of at most 80 g/l.

Preferably the precipitation solution contains 90-120 g/l of uranium, is treated with a 17.5% hydrogen peroxide solution, and an air-ammonia mixture having a volume ratio of 1:0.45 is led through and the pH is adjusted to 1.5-2.

It is especially advantageous if the circulation rate of the reaction mixture is regulated to such an extent by the stirring that the entire volume of liquid passes the stirrer 2-4 times a minute, preferably 3 times a minute, when the ammonia-air mixture is led in at a distance of 80-120 mm, preferably 100 mm above the inlet of the uranyl nitrate and the $H_2O_2$ solution is introduced 40-60 mm, preferably 50 mm above the inlet for the ammonia-air mixture.

The uranyl nitrate solution used generally contains 0.5 N free $HNO_3$ and is preferably produced by dissolving $U_3O_8$ with $HNO_3$. These solutions are used to produce less sinterable $UO_2$ powder, i.e., for the production of pellets with lower sintered density, for production of highly sinterable $UO_2$ powder (i.e., higher sintered density), there is added to the precipitation solution up to 80 g/l of ammonium nitrate.

The calcining can take place in air. The reduction takes place using a conventional reducing medium, e.g., hydrogen.

The flowability and sintering properties of the $UO_2$ powder are primarily influenced by the shape of the uranium peroxide precipitate. This must be spherical and remain constant during the entire time of precipitation. The uniformity of the precipitation is obtained by using a special precipitation apparatus.

BRIEF DESCRIPTION OF THE DRAWINGS

The invention will be understood best in connection with the drawings wherein.

Figure 1:
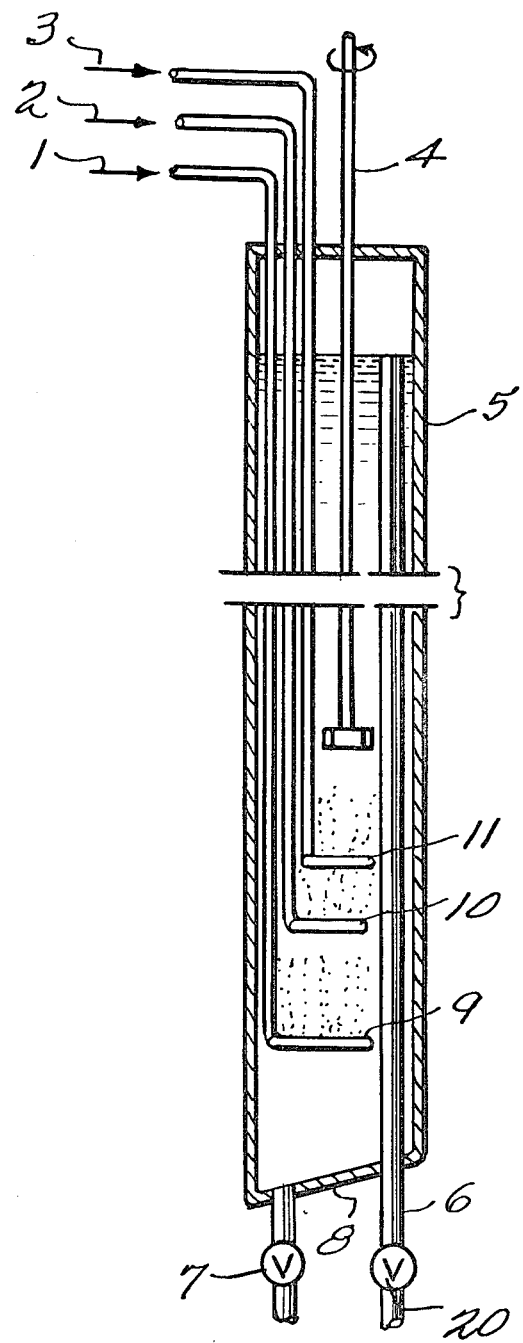
FIG. 1 is a schematic illustration of one form of apparatus for providing uniform precipitation.

Referring more specifically to FIG. 1, the precipitation apparatus consists of a container 5 with a safe geometry for all degrees of enrichments, for example, a V2A steel cylinder having a diameter of 125 mm. This vessel for example is 1.35 meters long and for purposes of heating and cooling has a double jacket (not shown). To draw off the solution, there is employed a flattened overflow tube 6 on the inner container wall and provided with a valve 20 and a draw off valve 7 is located on the sloping bottom 8. This container geometry is laid out for high degrees of enrichment (90-93% U-235), however, it is widened analogously for lower degrees of enrichments.

The solutions and gases are preheated, led via separate lines in three ring or annular nozzles 9, 10 and 11 of different sizes and fixed one above the other to the bottom of the precipitation container. The uranyl nitrate solution is led in via line 1, the ammonia gas-air mixture led in via line 2 and the hydrogen peroxide solution led in via line 3. The materials from these three lines are mixed by a rotor cage stirrer 4 having a diameter for example of 40 mm and rotating at, e.g., 500 rpm, a speed at which the solution volume is circulated three times per minute. Depending on the shape of the stirrer and the stirring speed, the precipitated uranium peroxide suspension is led in uniform ascending flow in the precipitation container upwardly to the overflow without causing a turbulence up to the wall of the container. It is important for the formation of the desired precipitation shape of the uranium peroxide that the spacing of the ring nozzles be fixed wherein the ring nozzle 10 for introduction of the $NH_3$-air mixture is 80–120 mm, preferably 100 mm above the place of introduction of the uranyl nitrate solution and the ring nozzle 11 for introduction of the $H_2O$ is 40–60 mm, preferably 50 mm above this. This spacing remains constant even at greater precipitation vessel diameter if the theoretical flow velocity is adjusted through the cross section over the nozzles to the same value. Furthermore, a rotor cage stirrer must be used which is about ⅓ as large in diameter as the diameter of the precipitation container and whose stirring velocity is so large that the volume of solution circulates three times per minute and there is produced a downward directed circulation. Besides a uniform speed of feeding the components is necessary.

The precipitated $UO_4.xH_2O$ goes directly from the overflow to a continuous filter. The uranium peroxide removed with suction is washed with hydrogen peroxide containing water and suction dried.

For example, for precipitation there is brought into the precipitation container by means of metering pumps via the lowest ring nozzle 9 25 l/h of uranyl nitrate solution containing 90 g/l of uranium and 0.5 N free $HNO_3$ and by addition of air diluted $NH_3$ gas (1 $Nm^3$/h air +0.45 $Nm^3$/h $NH_3$ gas) via the middle ring nozzle 10 and 5 l/h of aqueous hydrogen peroxide (17.5 weight %) via the uppermost ring nozzle 11. At a pH of 2 and at 40° C. the $UO_4.xH_2O$ is precipitated at a stirring velocity of 500 rpm.

The term $Nm^3$ means normal cubic meters, i.e., the number of meters at standard temperature (0° C.) and pressure (760 mm).

The pH was measured closely above the rotor cage stirrer 4 with the help of a glass electrode and the feeding of the $NH_3$ gas-air mixture changed according to the deviations occurring in the pH.

The uranium-hydrogen peroxide ratio was 1:1.5 according to the reaction equation:

$$UO_2(NO_3)_2 + H_2O_2 + xH_2O \rightleftharpoons UO_4.xH_2O + 2HNO_3$$

With this special precipitation process of the invention, there is obtained a uranium peroxide powder from rounded off to round agglomerates, which have an average grain size of 50–60μ and which are suited particularly for preparing $UO_2$ powder having a sintered density of 75 to 90% of the theoretical $UO_2$ pellet density. For this range, it suffices to vary the calcination temperaature from 500°–800° C. and to leave the reduction temperature constant at 650° C.

For the production of high density sinterable $UO_2$ powder, there is added a uranyl nitrate solution containing 90–120 g/l of uranium and 0.5 N free $HNO_3$ and up to 80 g/l of ammonium nitrate. The precipitation is carried out at pH 1.5 and 40° C. with a uranium to hydrogen peroxide ratio of 1:3, i.e., 10 l/h of $H_2O_2$ (17.5 weight %). Thereby, there is obtained a uranium peroxide powder which likewise has rounded to round agglomerates up to 50μ, whose greatest portion, however, is found in the region of about 20μ. This powder after the calcining results in high density sinterable qualities, i.e., pellets with 85 to 95% of the theoretical sintered density.

Figure 2:
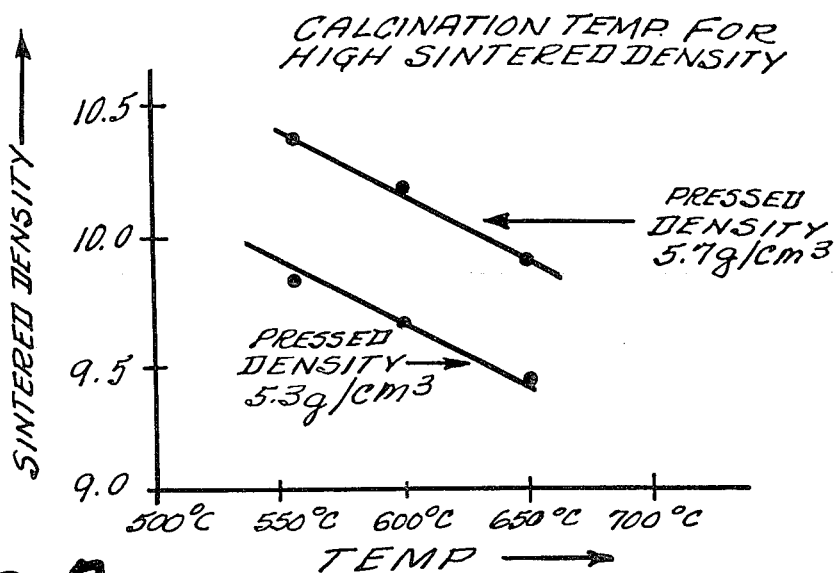
FIG. 2 is a graph of sintering density vs. temperature for high sintered density.
Figure 3:
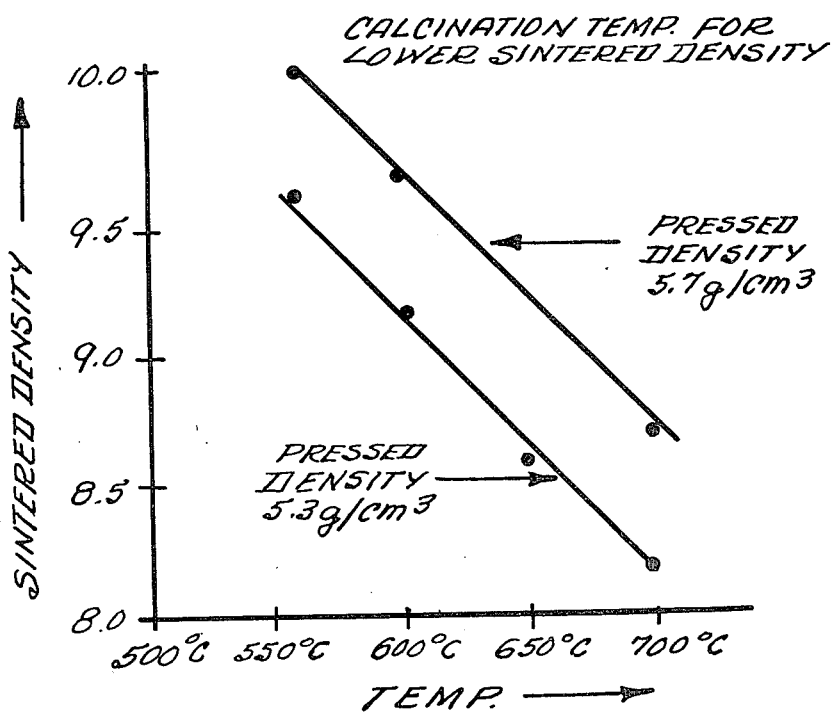
FIG. 3 is a graph similar to FIG. 2 but for low sintered density.

The strong dependency of the sintering properties of these precipitation products on the subsequent calcinization temperature is shown only by these spherical $UO_4.xH_2O$ precipitation products of the invention which can be seen from FIGS. 2 and 3 of the drawings. Other $UO_4$ precipitation products which were produced by other processes, e.g., as needle shaped crystals, do not show these variable properties. In FIGS. 2 and 3, the sintered density in g/cm³ is plotted against the calcination temperature.*

*In both figures the operating range is indicated by the two curves representing the upper and the lower limits of the usual green density (5.7 resp. 5.3 g/cm³).

Unless otherwise indicated, all parts and percentages are by weight.

The process can comprise, consist essentially of or consist of the steps set forth with the materials disclosed.

The process of the invention will be further explained by the following examples.

DESCRIPTION OF THE PREFERRED EMBODIMENT

Example 1

Production of Low Density Sinterable $UO_2$ Powder:

With the aid of a metering pump, there were led via inlet tube 1 of the lower ring nozzle 9 25 l/h of a uranyl nitrate solution containing 90 grams of uranium per liter. There was dosed in by way of inlet tube 2 an ammonia-air mixture (about 1 $Nm^3$/h air +0.45 $Nm^3$/h $NH_3$ gas) in such manner that during the precipitation there was maintained a pH of 2. The aqueous $H_2O_2$ solution (17.5 weight percent $H_2O_2$) was led in via inlet tube 3 at 5 l/h into the upper ring nozzle 11. At a precipitation temperature of 40° C. and a stirring speed of 500 rpm, there were formed round agglomerates of $UO_4.xH_2O$. The overflowing suspension was led to a filter via the overflow tube 6. The solids on the filter were washed with 10% $H_2O_2$ solution. The precipitation method, moreover has a good purification effect as is shown by Table 1 below:

TABLE 1

| Element | In the Uranyl nitrate starting solution per g of U | $UO_4 \times H_2O$ dried at 110° C. per g of U |
|---|---|---|
| Al | 245 ppm | 8 ppm |
| Ca | 200 ppm | 20 ppm |
| Cr | 78 ppm | 8 ppm |
| F | 430 ppm | 155 ppm |
| Fe | 300 ppm | 22 ppm |
| Ni | 61 ppm | 3 ppm |

A continuous tray furnace was chosen for the subsequent calcination and reduction. In FIG. 3, there is plotted what calcination temperatures must be chosen at a residence time of 100 minutes in the furnace in order to obtain the desired sintered qualities for low density sintered products. The calcining is carried out in air. The subsequent reduction to $UO_2$ was always carried out at the same temperature of 640° C. using hydrogen as the reducing gas (residence time in the furnace about 100 minutes).

The $UO_2$ powder obtained had the following characteristics:

TABLE 2

| U:O Ratio | 1:2.03 to 2.06 |
|---|---|

TABLE 2-continued

| | |
|---|---|
| $H_2O$ content | 0.20% |
| BET surface area | 3.0 to 4.3 $m^2/g$ |
| Bulk density | 2.5 to 2.8 $g/cm^3$ |
| Pourability | 1.4 sec per 20 grams |
| Density after sintering at 1650° C. | (Theoretical density 10.85 $g/cm^3$) |
| At 5.3 $g/cm^3$ pressed density | 8.1 to 9.65 $g/cm^3$ 74.7% to 88.9% of theory |
| At 5.7 $g/cm^3$ pressed density | 8.70 to 10.00 $g/cm^3$ 80 to 92% of theory |

Example 2

Production of High Density Sinterable $UO_2$ Powder

In this precipitation, there was used uranyl nitrate solutions which contained in one case 90 g/l of uranium and in another case 120 g/l of uranium and there were added in each case 80 grams of ammonium nitrate per liter. The precipitation which occurred in the manner previously described in connection with Example 1 was carried out at a pH of 1.5 and a temperature of 40° C. with a uranium to hydrogen peroxide ratio of 1:3, ie., there were dosed in 10 l/h of 17.5 weight % aqueous $H_2O_2$ per hour.

After calcining the precipitation product at the indicated temperatures according to FIG. 2 and carrying out the reduction to $UO_2$ again at 640° C. in the continuous furnace under the same reducing atmosphere as in Example 1 (100 minutes residence time) there were obtained the following properties of the $UO_2$ powder as set forth in Table 3.

TABLE 3

| Density after sintering at 1650° C.: | |
|---|---|
| pressed density of 5.3 $g/cm^3$ | 9.5 to 9.8 $g/cm^3$ 87 to 90% of theory |
| pressed density of 5.7 $g/cm^3$ | 9.9 to 10.3 $g/cm^3$ 91% to 95% of theory |

What is claimed is:

1. An apparatus for the continuous precipitation of uranium peroxide consisting essentially of a container, a stirrer therein having a rotor cage about ⅓ as large in diameter as the diameter of said container, a first conduit (1) including a first annular nozzle (9) in the container connected to a source of uranyl nitrate, a second conduit (2) including a second annular nozzle (10) in the container connected to a source of ammonia gas-air mixture, and a third conduit (3) including a third annular nozzle (11) in the container connected to a source of aqueous hydrogen peroxide, said second nozzle being located in the container at a distance of 80 to 120 mm above said first nozzle and said third nozzle being located in the container at a distance of 40 to 60 mm above said second nozzle.

2. The apparatus of claim 1, wherein the container is a cylindrical container.

* * * * *